UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN- & ANILINFARBEN-FABRIK, OF OFFENBACH-ON-THE-MAIN, GERMANY.

BROWN SULFUR DYE AND PROCESS OF MAKING SAME.

No. 801,598. Specification of Letters Patent. Patented Oct. 10, 1905.

Application filed July 15, 1905. Serial No. 269,849.

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented certain new and useful Improvements in Brown Sulfur Dyes, of which the following is a specification.

My invention relates to the manufacture of new brown sulfur dyes, which are distinguished by excellent properties of fastness. These dyestuffs are produced by subjecting to the melting process with alkali polysulfids the reaction products of formaldehyde and resorcin—as, for instance, methylene diresorcin or its condensation products—insoluble in alkalies, (cf. Caro, *Ber. D. D. Chem. Ges.*, XXV, 947, and Möhlau, *ibid*, XXVII, 2888,) together with the metadiamins of the benzol series. The new dyestuffs represent uniform products. They cannot be formed by mixing the dyestuffs, which might result by melting the single components.

In the following examples I shall describe the nature of my invention and how it may be best carried out and brought into practical effect. The parts are by weight and degrees, referring to the centigrade scale.

Example I: Mix together 23.2 parts of methylendiresorcin (or the same quantity of its polymeric product insoluble in alkalies) and 10.8 parts of meta-phenylen diamin, introduce the mixture at 100° to 110° into a polysulfid melt, prepared from one hundred parts of crystallized sodium sulfid, twenty-seven parts of sulfur, and forty parts of water. Gradually raise the temperature up to 170°, then heat the mass for two hours in the oven (baking-chamber) up to 200° to 220° centigrade. The coloring-matter thus produced can be directly employed for dyeing. It dissolves in water to a reddish-brown solution, from which, on addition of hydrochloric acid, it precipitates in dark-brown flocks. Its solution in concentrated sulfuric acid is yellowish brown. The dyestuff yields on cotton in a bath containing sodium sulfid brown shades resembling catechu, which are distinguished by an excellent fastness.

Example II: Prepare a mixture of 23.2 parts of methylendiresorcin (or of the same quantity of its polymeric product insoluble in alkalies) and 12.2 parts of meta-toluylendiamin and introduce it at 100° into a melt made from one hundred parts of sodium sulfid, 13.5 parts of sulfur, and fifty parts of water. Gradually raise the temperature up to 170° and finally heat for two hours to 200° to 220° in the oven, (baking-chamber.) The dyestuff thus obtained very much resembles that of the Example I in its properties; but it yields some more yellowish shades. When carrying out the melt with equimolecular proportions of sodium trisulfid or sodium tetra sulfid, dyestuffs of some darker shade result.

Now what I claim, and desire to secure by Letters Patent, is the following:

1. The process of making sulfur dyes by melting with alkali polysulfids the mixtures of the reaction products from formaldehyde and resorcin with the metadiamins of the benzol series, substantially as described.

2. As a new article of manufacture, the dyestuffs, which result from melting with alkali polysulfids the mixtures of the reaction products from formaldehyde and resorcin with the metadiamins of the benzol series, which form blackish powders, dissolve in concentrated sulfuric acid to a yellowish brown, in water, containing alkali sulfids, to a brown solution, from which hydrochloric acid precipitates the dyestuff in dark-brown flocks, and which dye on cotton from a bath containing alkali sulfids, brown shades of an excellent fastness, all substantially as hereinbefore described.

In testimony that I claim the foregoing as my invention I have signed my name, in presence of two witnesses, this 30th day of June, 1905.

AUGUST LEOPOLD LASKA.

Witnesses:
 EVA SATTLER,
 OSKAR STANDHARDT.